United States Patent

[11] 3,620,216

[72] Inventor Earl Thaddeus Szymanski
Chicago, Ill.
[21] Appl. No. 836,566
[22] Filed June 25, 1969
[45] Patented Nov. 16, 1971
[73] Assignee Abbott Laboratories
North Chicago, Ill.

[54] IMPLANT TROCAR
6 Claims, 4 Drawing Figs.

[52] U.S. Cl. .................................................. 128/217
[51] Int. Cl. .................................................. A61m 5/00
[50] Field of Search............................................ 128/217,
218, 213, 347, 264, 216, 222, 215, 223; 206/43

[56] References Cited
UNITED STATES PATENTS
615,425 12/1898 Butler.............................. 128/264
2,907,327 10/1959 White.............................. 128/217
FOREIGN PATENTS
245,802 8/1960 Australia......................... 128/217

Primary Examiner—L. W. Trapp
Attorney—Robert L. Niblack

ABSTRACT: An implant trocar for treating animals comprises a reciprocatory plunger within a pellet-containing barrel. The plunger is controlled by an operating shaft extending through a guiding slot in the wall of the barrel. A curved finger grip extends from the barrel opposite the operating shaft and enables the rounded heel of the barrel to be located against the palm of the hand of the user.

PATENTED NOV 16 1971

3,620,216

Inventor
EARL T. SZYMANSKI
By Robert J. Zellner
Attorney

IMPLANT TROCAR

BACKGROUND OF THE INVENTION

This invention relates to a device for implanting medication-releasing pellets into a body and more particularly relates to a trocar for implanting pellets beneath the skin of animals.

In the field of veterinary medicine the practice has developed of introducing hormones and/or antibiotics beneath the skin of animals in the form of a pellet which releases the medication at a controlled rate over a prolonged period of time to enhance growth of the animal or to influence its reproductive cycle. Frequently, the pellet is to serve a temporary purpose and is inserted into a location from which it may be removed at a later time.

In accomplishing the treatment of the animal, the pellet to be implanted is placed within a hollow needle or trocar near its tip, the needle is inserted through the skin of the animal and the pellet is forced form the needle. The needle is then withdrawn, leaving the pellet beneath the skin. Animals subject to such treatment include rather large species such as cattle and swine and the needles are necessarily of rather large size. The structure of the trocar must, therefore, be such to facilitate application of considerable force during the implanting operation yet provide for delicate control throughout the procedure.

It is an object of this invention therefore to provide a trocar for inserting a pellet beneath the skin of an animal. It is the further object of this invention to provide a trocar which provides for the application of large amount of force with a delicate degree of control.

It is still a further object of this invention to provide a trocar which is readily disassembled for cleaning and which reduces the possibility of transfer of body fluids from animal to animal. It is still a further object of this invention to provide a trocar which requires only one hand for its operation. Other objects of the invention will become apparent from the following description and drawings.

The objects of this invention are achieved through the provision of a trocar preferably made of stainless steel and having a hollow barrel portion to contain a pellet to be implanted beneath the skin. Gripping surfaces are provided so that adequate force can be exerted to penetrate the animal hide. After the skin has been pierced, a guided plunger is moved to eject the pellet. Sealing means between the tip of the plunger and the bore of the barrel limits the amount of blood or animal body substance retained by the trocar tip.

The invention will be better understood from reference to the following drawings, wherein.

Figure 1:
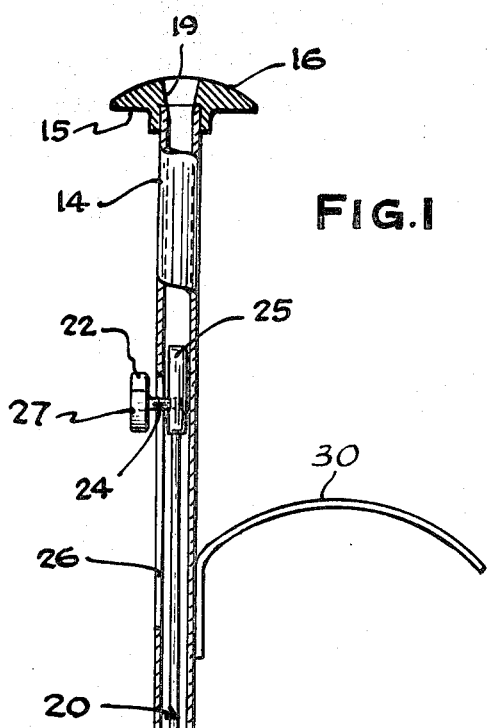
FIG. 1 is a side elevation, partly in section, of a trocar of this invention.

Referring now to FIG. 1, there is illustrated a trocar having a tubular barrel 10 with a sharpened tip end 12 and a heel end 14. Secured to the heel end of the barrel is a heel button 15 including a rounded surface 16 and a central opening 19. The barrel bore 18 continues through the heel button and terminates in a conical taper which makes a small angle, such as about 5°, with the axis of the barrel. The dimensions of the trocar are not critical but for treating cattle and swine the barrel may be about 7–8 inches long and about one-fourth to three-eights inch in diameter.

Within the bore 18 is a slidable plunger 20. At the heel end 25 of the plunger, a knob 22 is mounted on a small radially extending threaded shaft 24 adapted to move in and be guided by a longitudinal slot 26 in the side of the barrel. The top 27 of the knob is provided with a slip-resistant surface such as is developed by knurling or by a series of concentric grooves or a slight circular depression. The plunger ends 21 and 25 are a loose-sliding fit within the bore 18 and are joined by central portion 23, having its diameter reduced to insure free movement within the bore. The tip end 21 of the plunger is provided with a groove and an O-ring 28 to seal the bore of the barrel.

A gently curving finger grip 30 extends from the barrel diametrically opposite the slot 26 and is attached by a weld or by silver solder.

Figure 2:
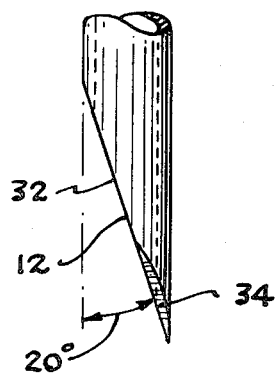
FIG. 2 is an enlarged view of the side elevation of the sharpened tip of the trocar.
Figure 3:
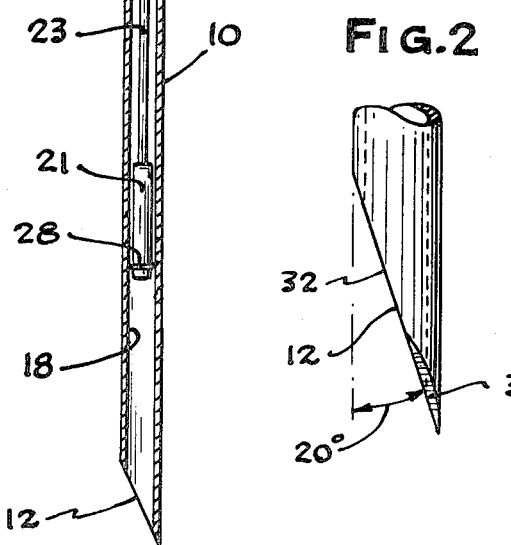
FIG. 3 is a plan view of the tip of FIG. 2.

FIG. 2 illustrates the sharpened tip of the trocar wherein the barrel terminated by a bevel 32 ground at an angle of about 20°. The intersection 36 of the bevel 32 with the bore 18 is slightly rounded to prevent "coring" upon penetration of the needle through the skin. To reduce penetration force, a pair of flats 34 are ground at the tip of the needle at an angle of about 25° to the axis of the barrel and at an angle of 90° to the surface of the bevel 22. Desirably, the grinding of the flats 34 is limited so that they do not intersect the surface of the bore 18. A sharp edge is formed at the intersection of the flat 34 and bevel 32.

Figure 4:
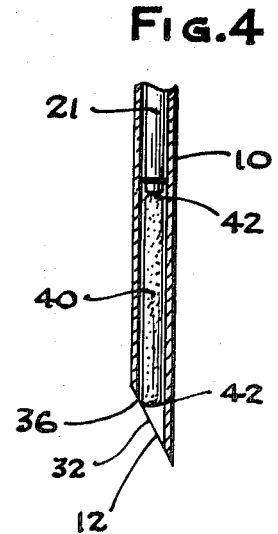
FIG. 4 is a partial view of the tip of the trocar showing a pellet in place.

In FIG. 1, the plunger 20 is shown in its retracted position with the operating shaft 24 toward that portion of the slot 26 which is nearest the heel end 14 of the barrel. With the plunger so located, a cylindrical pellet is inserted into the tip of the barrel 12. In FIG. 4, there is illustrated a pellet 40 having a rounded or squared ends 42 located in the tip of the barrel. The length of the pellet and the plunger are such that when the plunger is in the retracted position, it locates the pellet with one end extending barely beyond the intersection of the bevel 32 with the bore 18 which arrangement reduces "coring" by the edge 36. When using shorter pellets, the plunger is advanced by the knob 22 on shaft 24 to locate the tip of the pellet as indicated above.

To implant the pellet beneath the animal's skin, the trocar is grasped with the fingers around he grip 30 and the heel button 15 is placed in the palm of the hand. Thus, the trocar is firmly held and adequate pressure is applied to pierce the skin. To eject the pellet, the thumb is placed over the knob 22 to slide the plunger forward moving the operating shaft 24 in the guide slot 26. The empty trocar is then withdrawn and the puncture closes in the hide. The O-ring 28 seals the tip of the barrel so that only a very limited quantity of blood and body fluids can enter the bore 18 and perhaps be carried to the next animal. The seal also prevents transfer to the animal of any contamination which may be present in the longer heel portion of the bore.

Cleaning of the plunger and the bore is readily accomplished by unthreading the operating shaft 24 from the plunger end 25 and withdrawing the plunger through the opening 19 in the heel button 16. Upon reinsertion, the taper 19 provides a smooth and gently sloping path which easily passes the O-ring 28 without scuffing into sealing engagement with the bore.

From the foregoing description and drawings, it is believed that one skilled in the art is enabled to use this invention to its fullest extent without further elaboration.

I claim:

1. An implant trocar comprising in combination a barrel having a tubular wall defining a bore and terminating in a heel end having a conical surface with its large end outermost and a sharpened tip end, said wall having a longitudinal slot therethrough intermediate said ends, a grip extending radially from said wall opposite said slot, a plunger having tip and heel ends slidably received within said bore and adapted to reciprocate between a retracted and forward position, an operating shaft extending from said plunger heel end and through said slot, and sealing means between said plunger tip and said bore.

2. A trocar according to claim 1 wherein the sealing means is an O-ring.

3. A trocar according to claim 1 wherein the sharpened tip comprises a bevel surface at an angle of about 20° to the axis of said bore and two flats at an angle of about 90° to the bevel surface.

4. A trocar according to claim 1 wherein the plunger has a section of reduced diameter between its ends.

5. An implant trocar as in claim 3 including a pellet within said bore and adjacent the tip of the barrel, the length of the pellet and plunger being sufficient that the tip of the pellet extends to the intersection of the bevel and bore when the plunger is in a retracted position.

6. A trocar according to claim 1 having a rounded, palm-contacting surface on the heel end of the barrel.

* * * * *